April 12, 1955     B. BEDERSON     2,706,256
NONELECTRONIC RECTANGULAR WAVE GENERATOR
Filed Feb. 6, 1953
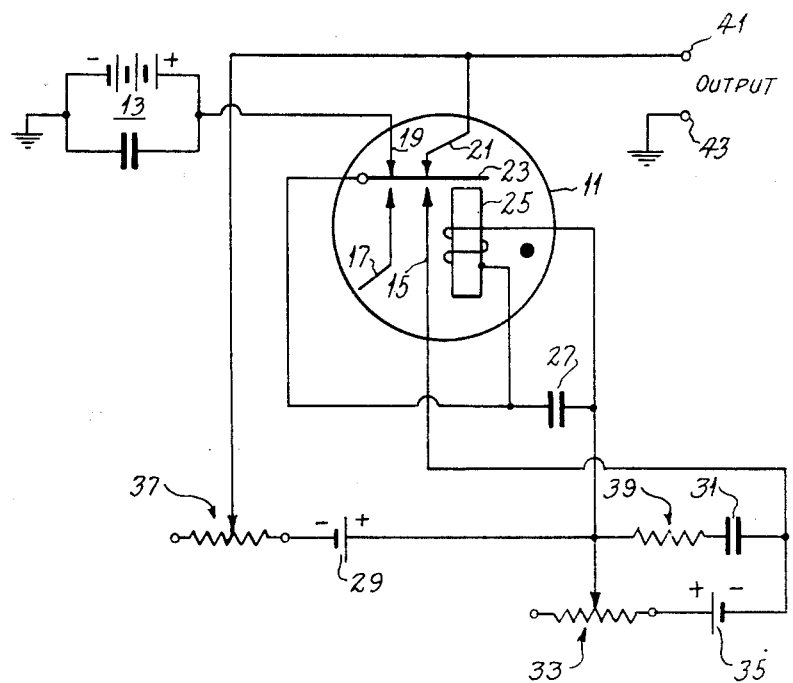
INVENTOR.
BENJAMIN BEDERSON
BY
Roderick B. Jones
ATTORNEYS

United States Patent Office 2,706,256
Patented Apr. 12, 1955

2,706,256

NONELECTRONIC RECTANGULAR WAVE GENERATOR

Benjamin Bederson, New York, N. Y., assignor, by mesne assignments, to the United States of America as represented by the Secretary of the Navy Application February 6, 1953, Serial No. 335,491

4 Claims. (Cl. 307—96)

The present invention relates to generators for the production of rectangular waves and more particularly to a mercury contact relay tube that can be conveniently used to produce rectangular pulses of variable duration.

Various electronic and nonelectronic circuits have been proposed for producing rectangular waves due to the ever increasing demands for such circuits in the radio and electronics arts. In general, electronic devices employing thyratrons or gate circuits, or devices using electric motors have been designed for generating rectangular waves. While the above mentioned means are capable of producing oscillatory waves of the required shape, they are subject to the disadvantages of relatively high costs, unreliability, and complex circuitry.

Accordingly, it is an object of the present invention to provide a nonelectronic generator whose output voltage is substantially rectangular.

Another object of the present invention is to provide a simplified rectangular wave generator.

A further object is to provide a rectangular wave generator that can be easily constructed, that is stable in operation and that can be easily adjusted.

A still further object of the present invention is to provide a generator, the output voltage of which is rectangular and free from oscillations and noise.

Still another object is to provide a rectangular wave generator whose applied peak voltage can be made independent of the load.

These and other objects of the present invention will better be understood from the following detailed description of a preferred embodiment thereof taken in connection with the appended drawing.

In accordance with a specific embodiment of the invention as shown in the drawing, a nonelectronic rectangular wave generator has been provided which utilizes a simple mercury contact relay tube or switch 11, such as a Western Electric type 275A, in series with a suitable D. C. power supply 13 and a resistive load (not shown). Said relay tube 11 comprises four contactors 15, 17, 19 and 21, an armature 23, and a solenoid or relay coil 25. A condenser 27 is connected across the terminals of coil 25. Connected in series with contactor 21 is the movable contact arm of a potentiometer 37, one side of said potentiometer being connected to the minus side of a battery 29. Armature 23 is serially connected to one end of coil 25. The other end of coil 25 is connected to the movable contact arm of potentiometer 33. Said potentiometer 33 is connected in series with a second battery 35 which in turn is connected to contactor 15. A series resistance-capacitance circuit consisting of resistor 39 and capacitor 31 is inserted in parallel with potentiometer 33 and battery 35. Connected to the movable contact arm of the potentiometer 33 is the positive side of battery 29. The output of the generator is taken from contactor 21 of relay 11 and ground and is terminated at terminals 41 and 43.

Operation of the generator is as follows: In the nonactivated position of relay 11 as shown in the drawing, armature 23 makes contact with contactors 19 and 21. At the start of a cycle, battery 29 charges capacitor 27 through contactor 21, armature 23 and potentiometer 37 and applies a voltage across relay coil 25 of sufficient strength to activate said coil. While the switch is in the nonactivated position battery 35 charges capacitor 31 through potentiometer 33 and resistor 39. Armature 23 is actuated by solenoid 25 thereby connecting contactor 15 to said armature and disconnecting battery 29 from the circuit. With armature 23 in the activated position capacitors 27 and 31 discharge due to the voltage drop across potentiometer 33. The duration of activation depends upon the values of capacitors 27 and 31 and potentiometer 33 and battery 35. The time during which the load is supplied with power (the nonactivated period) is dependent on the values of capacitor 27, potentiometer 37 and battery 29.

The pulse rise and decay times are each less than 0.1 microsecond. With the specific circuit shown, the pulse width as well as the time between pulses can be varied independently from $10^{-2}$ to 2.5 seconds. During the conductance of tube 11, there is essentially zero voltage drop across said tube. The output pulse is rectangular in form and free of oscillations and noise. A pulse of 250 volts and 1 ampere (250 watts), which is the maximum power rating of the tube, can be attained. Since the output pulse is applied through the relay to the components of the circuit, care must be exercised to maintain the capacity-to-ground of these circuit elements at a low value, and their insulation from ground must be adequate. The output pulse can have either positive or negative polarity.

From the foregoing discussion, it can be seen that a precision pulse generator having a rapid rise, and low-repetition-rate has been devised. This rectangular wave generator is extremely simple to construct and reliable in operation. Moreover, the output pulse is free of oscillations and noise and the applied peak voltage can be made independent of the load.

While a particular embodiment of the invention has been shown and described herein, it is not intended that the invention be limited to such disclosure, but that changes and modifications can be made and incorporated within the scope of the claims.

What is claimed:

1. In combination with a mercury contact relay switch having two pairs of contacts, an armature and a relay coil, a source of D. C. power connected to the normally closed pair of contacts of such switch, a load circuit connected to the normally closed contacts of such switch, and an electrical charging and discharging circuit connected to the relay coil for causing the armature of said switch to make contact with one or the other pair of contacts, opening and closing the switch, whereby a rectangular pulse is produced.

2. The invention of claim 1 wherein adjustable timing means are provided for varying the frequency at which the switch remains in open and/or closed positions.

3. A nonelectronic device for generating a rectangular wave comprising a contact relay switch having two pairs of contacts, an armature and a relay coil, a source of D. C. power connected to the normally closed contacts of said switch, a resistive load circuit connected to the normally closed contacts of said switch, and electrical energizing means connected to the relay coil of said switch for intermittently opening and closing the switch.

4. A nonelectronic device for generating a rectangular wave comprising a contact relay switch having two pairs of contacts, an armature and a relay coil, a source of D. C. power connected to the normally closed contacts of said switch, a resistive load circuit connected to the normally closed contacts of said switch, and an electrical charging and discharging circuit connected to the relay coil for causing the armature of said switch to make contact with one or the other pair of contacts, opening and closing the switch.

References Cited in the file of this patent

UNITED STATES PATENTS 2,371,986    Frydman _____ Mar. 20, 1945